(12) United States Patent
Horng et al.

(10) Patent No.: US 6,654,213 B2
(45) Date of Patent: Nov. 25, 2003

(54) STATOR AND BEARING FIXING STRUCTURE OF A MOTOR

(75) Inventors: Alex Horng, Kaohsiung (TW); Yin-Rong Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/075,294

(22) Filed: Feb. 15, 2002

(65) Prior Publication Data

US 2003/0156366 A1 Aug. 21, 2003

(51) Int. Cl.[7] .......................... H02H 5/04; H02K 11/00
(52) U.S. Cl. .................................... 361/23; 310/67 R
(58) Field of Search .......................... 361/22, 23, 25; 310/67 R, 254, 259, 62, 63

(56) References Cited

U.S. PATENT DOCUMENTS

| | | | | |
|---|---|---|---|---|
| 4,682,065 A | * | 7/1987 | English et al. | 310/90 |
| 5,245,236 A | * | 9/1993 | Horng | 310/67 R |
| 5,363,003 A | * | 11/1994 | Harada et al. | 310/67 R |
| 5,610,462 A | * | 3/1997 | Takahashi | 310/90 |
| 6,102,675 A | * | 8/2000 | Hsieh | 417/423.13 |
| 6,376,946 B1 | * | 4/2002 | Lee | 310/67 R |

* cited by examiner

Primary Examiner—Gregory J. Toatley, Jr.
Assistant Examiner—Danny Nguyen
(74) Attorney, Agent, or Firm—Bacon & Thomas, PLLC

(57) ABSTRACT

A stator and bearing fixing structure of a motor includes a housing provided with a shaft seat having a bottom provided with a bottom stop member and having an outer wall provided with multiple snap members. An insulating seat consisting of an upper insulating plate and a lower insulating plate may isolate a magnetically conductive assembly and may be wound with metallic coils, thereby forming a stator which is mounted on the outer wall of the shaft seat. The upper insulating plate is provided with an annular lip, and the lower insulating plate is provided with multiple protruding snap members that may be snapped with the snap members of the shaft seat. A bearing is placed in the shaft seat and has a first end stopped by the bottom stop member, and a second end pressed by the annular lip.

4 Claims, 4 Drawing Sheets

STATOR AND BEARING FIXING STRUCTURE OF A MOTOR

BACKGROUND OF THE INVENTION

1. Field of the Invention

The present invention relates to a stator and bearing fixing structure of a motor, and more particularly to a stator and bearing fixing structure of a motor, wherein the stator and the bearing may be assembled conveniently and rapidly, and may have a rigid positioning effect without detachment.

2. Description of the Related Art

A conventional bearing fixing structure of a heatsink fan in accordance with the prior art shown in FIGS. 1 and 2 is disclosed in Taiwanese Patent Publication No. 328858, and comprises a heatsink frame 90 having a shaft tube 91 formed with multiple openings 92, thereby defining multiple blades in the shaft tube 91. Each of the blades of the shaft tube 91 is formed with an upper lug 93 or a lower lug 94. The upper lugs 93 and the lower lugs 94 of the blades of the shaft tube 91 are arranged in a staggered manner. The distance between the upper lug 93 and the lower lug 94 is the same as the thickness of the bearing 95, so that the bearing 95 may be retained by the blades of the shaft tube 91, and may be limited by the upper lugs 93 and the lower lugs 94.

However, the shaft tube 91 is made with a special structure so that the bearing 95 may be fixed in the shaft tube 91. Thus, fabrication of the conventional bearing fixing structure of a heatsink fan is not easy.

A conventional stator combination structure of a heatsink fan in accordance with the prior art shown in FIGS. 3 and 4 is disclosed in Taiwanese Patent Publication No. 179991, and comprises a metallic shaft tube 80 provided with an annular lip 801 slightly greater than the inner diameter of the shaft hole 811 of the stator 81, so that after the metallic shaft tube 80 is closely fitted into the shaft hole 811 of the stator 81, the metallic shaft tube 80 may be strongly pressed into the central post hole 821 of the housing 82.

However, the metallic shaft tube 80 is closely fitted into the shaft hole 811 of the stator 81, so that the bearing received in the metallic shaft tube 80 will be compressed and deformed. Thus, rotation of the motor easily produces noise due to the deformed bearing, and the lifetime of the motor is decreased.

SUMMARY OF THE INVENTION

The primary objective of the present invention is to provide a stator and bearing fixing structure of a motor, wherein the stator may be fixed on the 11 outer wall of the shaft seat conveniently and rapidly.

A secondary objective of the present invention is to provide a stator and bearing fixing structure of a motor, wherein the bearing may be fixed within the inner wall of the shaft eat conveniently and rapidly.

A further objective of the present invention is to provide a stator and bearing fixing structure of a motor, that has a simple construction, may be made easily, may reduce noise during rotation of the motor, and may increase the lifetime of the motor.

In accordance with the present invention, a stator and bearing fixing structure of a motor includes a housing provided with a shaft seat. The shaft seat has a bottom provided with a bottom stop member. The shaft seat has an outer wall provided with multiple snap members. An insulating seat consisting of an upper insulating plate and a lower insulating plate may isolate a magnetically conductive assembly and may be wound with metallic coils, thereby forming a stator which is mounted on the outer wall of the shaft seat. The upper insulating plate is provided with an annular lip protruded toward a center. and the lower insulating plate is provided with multiple protruding snap members that may be snapped and locked with the snap members of the outer wall of the shaft seat. A bearing is placed in the shaft seat of the housing, and has a first end stopped by the bottom stop member of the shaft seat without detachment, and a second end pressed and positioned by the annular lip of the upper insulating plate of the insulating seat.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
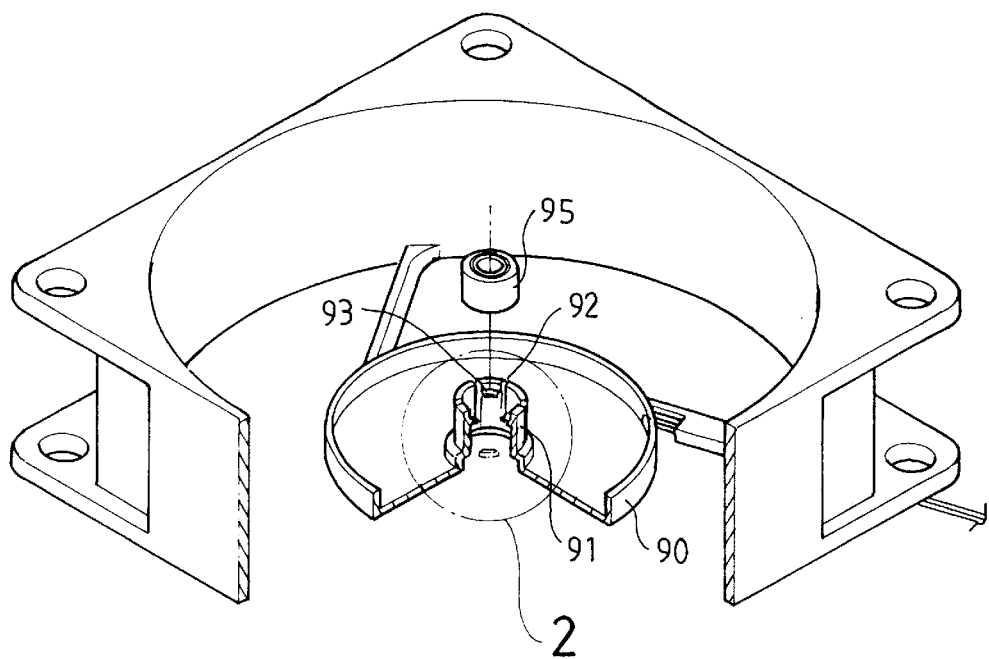
FIG. 1 is an exploded perspective view of a conventional structure in accordance with the prior art.
Figure 2:
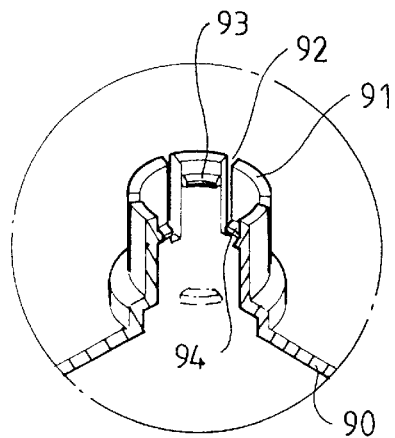
FIG. 2 is a locally cross-sectional enlarged view of FIG. 1.
Figure 3:
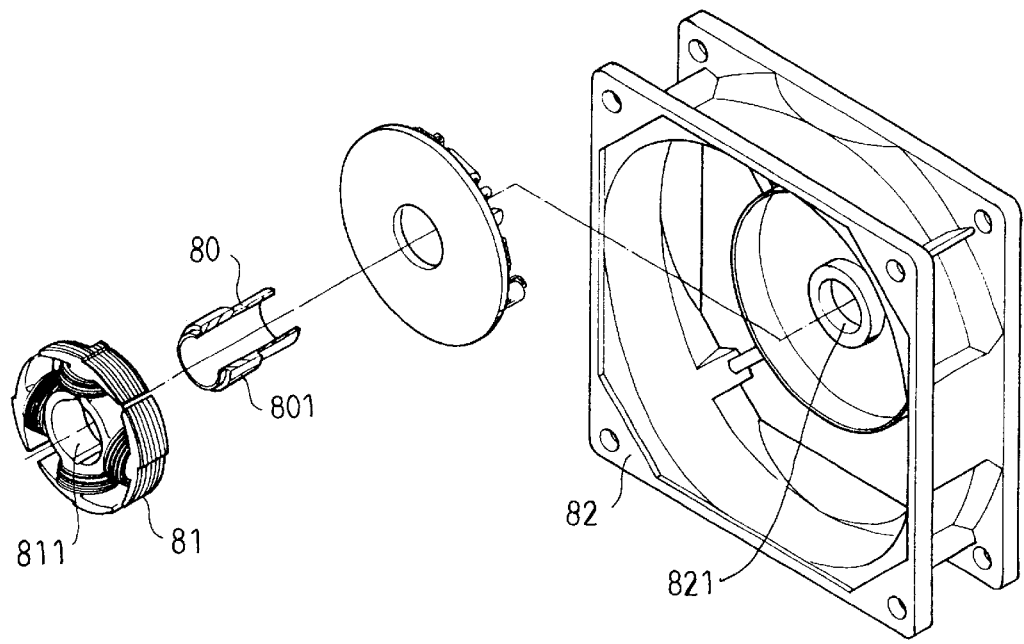
FIG. 3 is an exploded perspective view of another conventional structure in accordance with the prior art.
Figure 4:
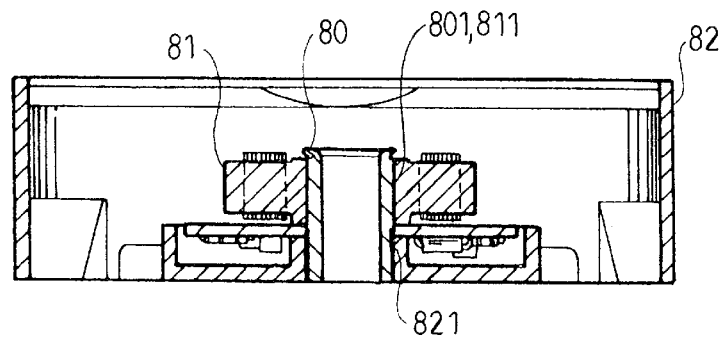
FIG. 4 is a locally cross-sectional enlarged view of FIG. 3.
Figure 5:
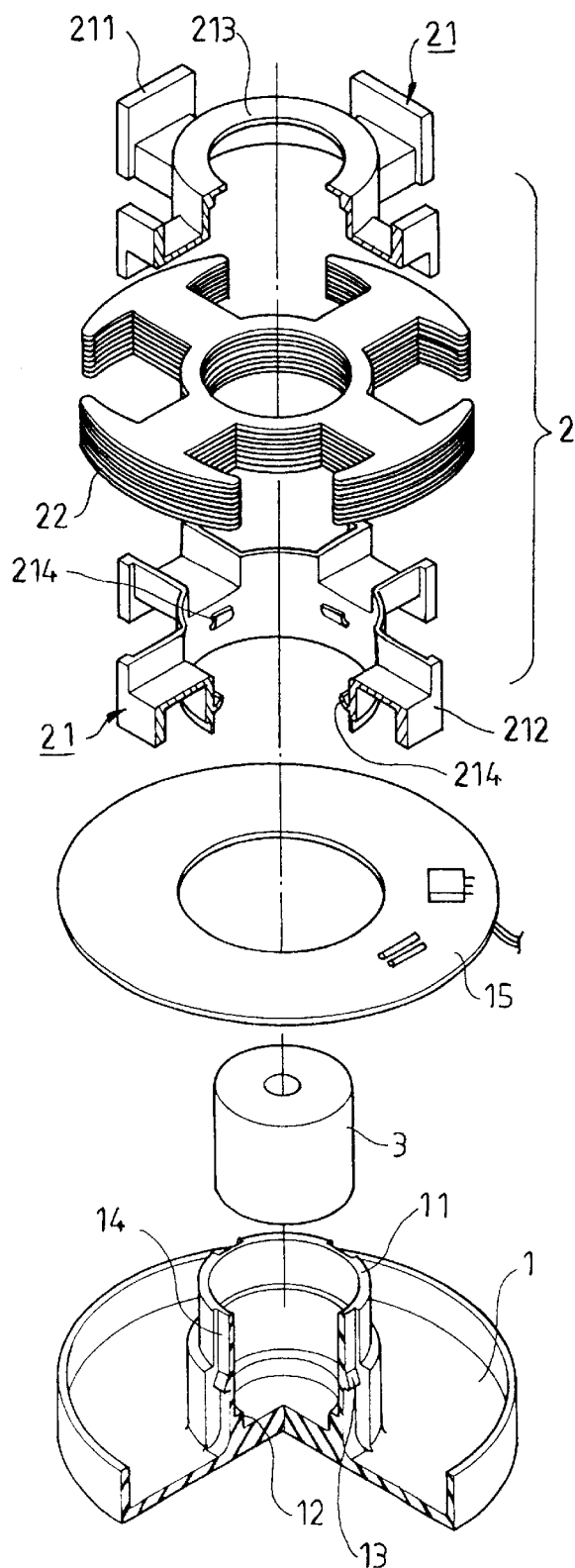
FIG. 5 is an exploded perspective view of a stator and bearing fixing structure of a motor in accordance with a preferred embodiment of the present invention.

Referring to the drawings and initially to FIG. 5, a stator and bearing fixing structure of a motor in accordance with a preferred embodiment of the present invention comprises a housing 1, a stator 2, and a bearing 3.

The housing 1 may be the housing of a conventional motor, heatsink fan or the like. The housing 1 is provided with a shaft seat 11 having an inner wall for receiving the bearing 3, and an outer wall combined with the stator 2. The inner wall of the shaft seat 11 has a bottom provided with a bottom stop member 12. The housing 1 may be directly formed with a protruding ring or closure bottom plate, so as to form the bottom stop member 12. Alternatively, a plate may be fixed on the bottom of the inner wall of the shaft scat 11 by a fixing method, such as bonding or the like. so as to form the bottom stop member 12. The outer wall of the shaft seat 11 has multiple snap members 13 each of which may be formed with a triangular conic shape. The conic shaped bottom of each of the snap members 13 has a locking effect. In the preferred embodiment of the present invention, the snap members 13 are provided in the grooves 14 formed in the outer wall of the shaft seat 11. In addition, a conventional Circuit board 15 may be mounted on the outer wall of the shaft seat 11 of the housing 1.

The stator 2 is combined on the outer wall of the shaft seat 11 of the housing 1, and includes an insulating seat 21, and a magnetically conductive assembly 22. The magnetically conductive assembly 22 is enclosed by the insulating seat 21, and the magnetically conductive assembly 22 together with the insulating seat 21 is wound with metallic coils. Preferably, the insulating seat 21 consists of an upper insulating plate 211, and a lower insulating plate 212. The upper insulating plate 211 is provided with a protruding annular lip 213 that may press the bearing 3. The lower insulating plate 212 has an inner wall provided with multiple protruding snap members 214 that may be locked with the snap members 13 provided in the outer wall of the shaft seat 11. Preferably, the snap members 13 are provided in the grooves 14 formed in the outer wall of the shaft seat 11, so that the stator 2 may have a better locking and snapping effect.

The bearing 3 may be a conventional self-lubricating bearing, ball bearing, or the like. The bearing 3 may be received in the inner wall of the shaft seat 11, and a non-close fit may be formed between the bearing 3 and the inner wall of the shaft seat 11. The bearing 3 has a first end limited by the bottom stop member 12 of the shaft seat 11 without detachment, and a second end pressed by the annular lip 213 of the upper insulating plate 211 of the insulating seat 21, so that bearing 3 may be secured in the inner wall of the shaft seat 11 rapidly and rigidly. A rotor has a rotation shaft may be rotatably mounted in the bearing 3.

Figure 7:
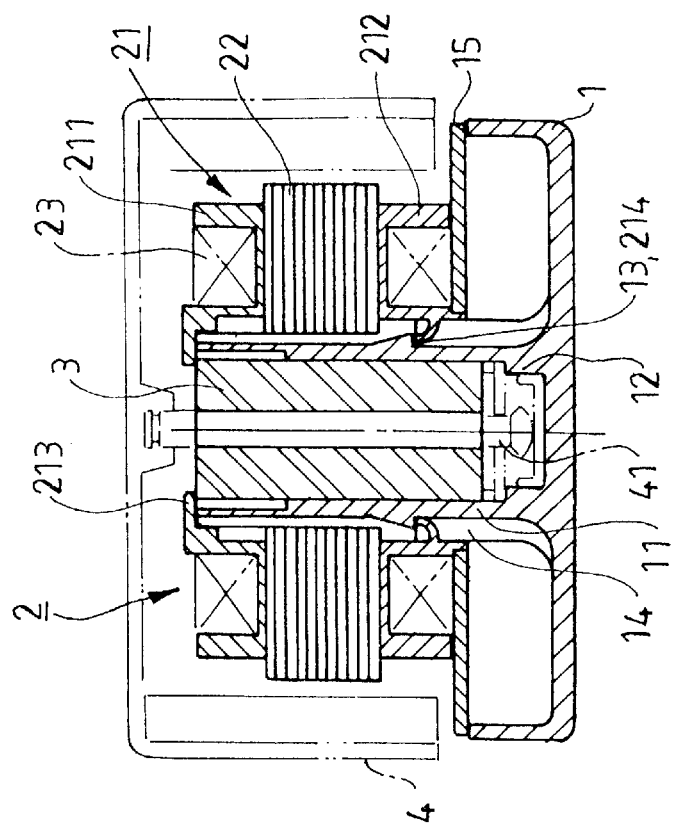
FIG. 7 is a plan cross-sectional assembly view of the stator and bearing fixing structure of a motor as shown in FIG. 5.
Figure 6:
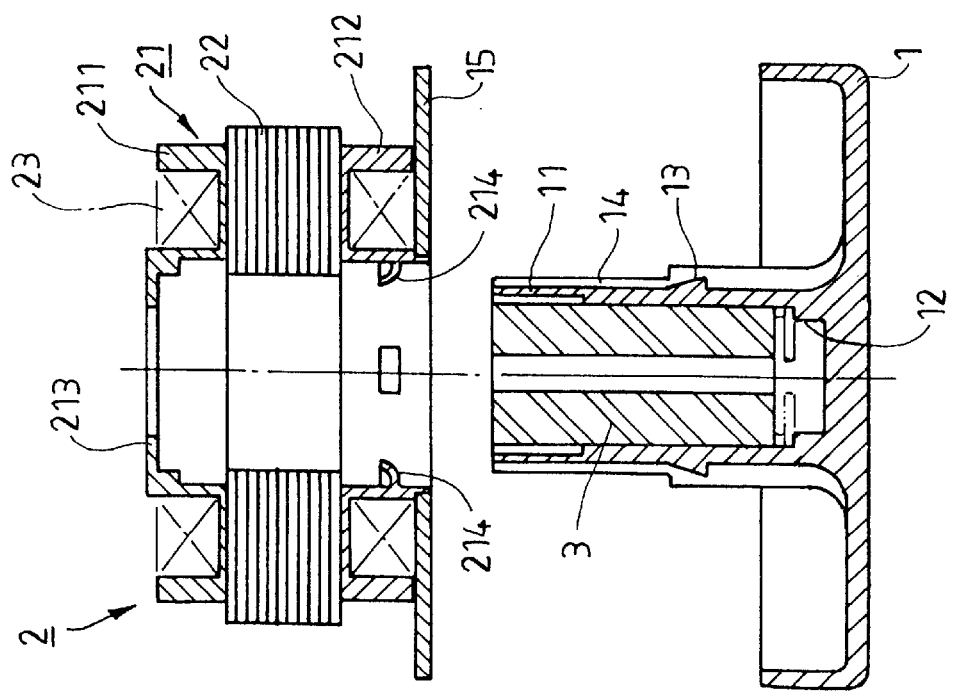
FIG. 6 is a locally plan cross-sectional assembly view of the stator and bearing fixing structure of a motor as shown in FIG. 5.

Referring to FIGS. 6 and 7, the bearing 3 may be received in the inner wall of the shaft seat 11. The magnetically conductive assembly 22 is enclosed by the upper insulating plate 211 and the lower insulating plate 212 of the insulating seat 21, and the magnetically conductive assembly 22 together with the insulating seat 21 is wound with metallic coils, thereby forming the stator 2. The stator 2 may be mounted on the outer wall of the shaft seat 11. The snap members 214 of the lower insulating plate 212 may be locked with the snap members 13 of the shaft seat 11, thereby preventing detachment of the stator 2. The annular lip 213 of the upper insulating plate 211 of the insulating seat 21 may press the bearing 3, thereby preventing detachment of the bearing 3. Thus, the stator 2 and the bearing 3 may be assembled conveniently and rapidly, and may have a rigid positioning effect. In addition, the rotation shaft 41 of the rotor 4 may be rotatably mounted in the stator 2.

Accordingly, in the stator and bearing fixing structure of a motor in accordance with a preferred embodiment of the present invention, the stator and the bearing may be assembled conveniently and rapidly, and may have a rigid positioning effect without detachment.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A stator and bearing fixing structure of a motor, comprising:
    a housing, provided with a shaft seat, the shaft seat having a bottom provided with a bottom stop member integrally formed with the housing, the shaft seat having an outer wall provided with multiple snap members;
    a stator, including an insulating seat for isolating a magnetically conductive assembly and wound with metallic coils, the insulating seat having an upper portion provided with an annular lip protruded toward a center, and a lower portion provided with multiple snap members that are arranged to be snapped and locked with the snap members of the outer wall of the shaft seat; and
    a bearing, placed in the shaft seat, placed in the shaft seat of the housing, and having a first end stopped by the bottom stop member of the shaft seat without detachment, and a second end pressed and positioned by the annular lip of the insulating seat,
    wherein, when said multiple snap members of the lower portion of the stator are snapped and locked with the snap members of the outer wall of the shaft seat, the annular lip of the upper portion of the stator presses the bearing against the integrally formed bottom stop member.

2. The stator and bearing fixing structure of a motor as claimed in claim 1, wherein the insulating seat consists of an upper insulating plate, and a lower insulating plate.

3. The stator and bearing fixing structure of a motor as claimed in claim 2, wherein the upper insulating plate is provided with the annular lip protruded toward a center.

4. The stator and bearing fixing structure of a motor as claimed in claim 2, wherein the lower insulating plate is provided with the multiple protruding snap members.

* * * * *